Oct. 4, 1949.   S. C. CARNEY   2,483,877
METHOD AND APPARATUS FOR CONTINUOUS POLYMERIZATION
Filed March 7, 1946   4 Sheets-Sheet 2

INVENTOR.
S.C. CARNEY
BY Hudson and Young.
ATTORNEYS

Oct. 4, 1949.   S. C. CARNEY   2,483,877
METHOD AND APPARATUS FOR CONTINUOUS POLYMERIZATION
Filed March 7, 1946   4 Sheets-Sheet 3

INVENTOR.
S.C. CARNEY
BY Hudson and Young
ATTORNEYS

Patented Oct. 4, 1949

2,483,877

UNITED STATES PATENT OFFICE 2,483,877

METHOD AND APPARATUS FOR CONTINUOUS POLYMERIZATION

Samuel C. Carney, Bartlesville, Okla., assignor to Phillips Petroleum Company, a corporation of Delaware Application March 7, 1946, Serial No. 652,714

14 Claims. (Cl. 18—15)

This invention relates to a method and apparatus for conducting a polymerization reaction continuously. More particularly it relates to the continuous polymerization of fluid material to solid form. In another aspect, it relates to the continuous polymerization of liquids to form plastic solids, especially synthetic resins and rubbers, often known as elastomers. In a preferred aspect, it relates to the production of butyl rubber.

The principal object of my invention is to provide an improved method of polymerizing fluid materials to solid form. Another object is to provide an improved method for polymerizing liquids containing polymerizable unsaturated compounds to plastic solids. Still another object is to provide an improved method of making synthetic resins and rubbers. Still another object is to provide an improved method of making butyl rubber. Another object is to perform the polymerization reaction continuously and to withdraw the plastic formed as a continuous coherent strip. Another object is to provide an improved method of removing the heat of polymerization from the point at which said heat is generated, especially in the manufacture of butyl rubber. Another object is to provide a method of making butyl rubber in which the reaction is kept under absolutely complete control at all times whereby the necessity for shutting down and digging the solid material from the reaction vessel is eliminated. Another object is to provide novel apparatus for carrying out the method of the foregoing objects. Many other objects of my invention will appear from the following description.

In the accompanying drawing, Fig. 1 is a side elevation, with the polymerizing vessel partially in section, of one arrangement of equipment which is very advantageous for carrying out the present invention.

Figure 6:
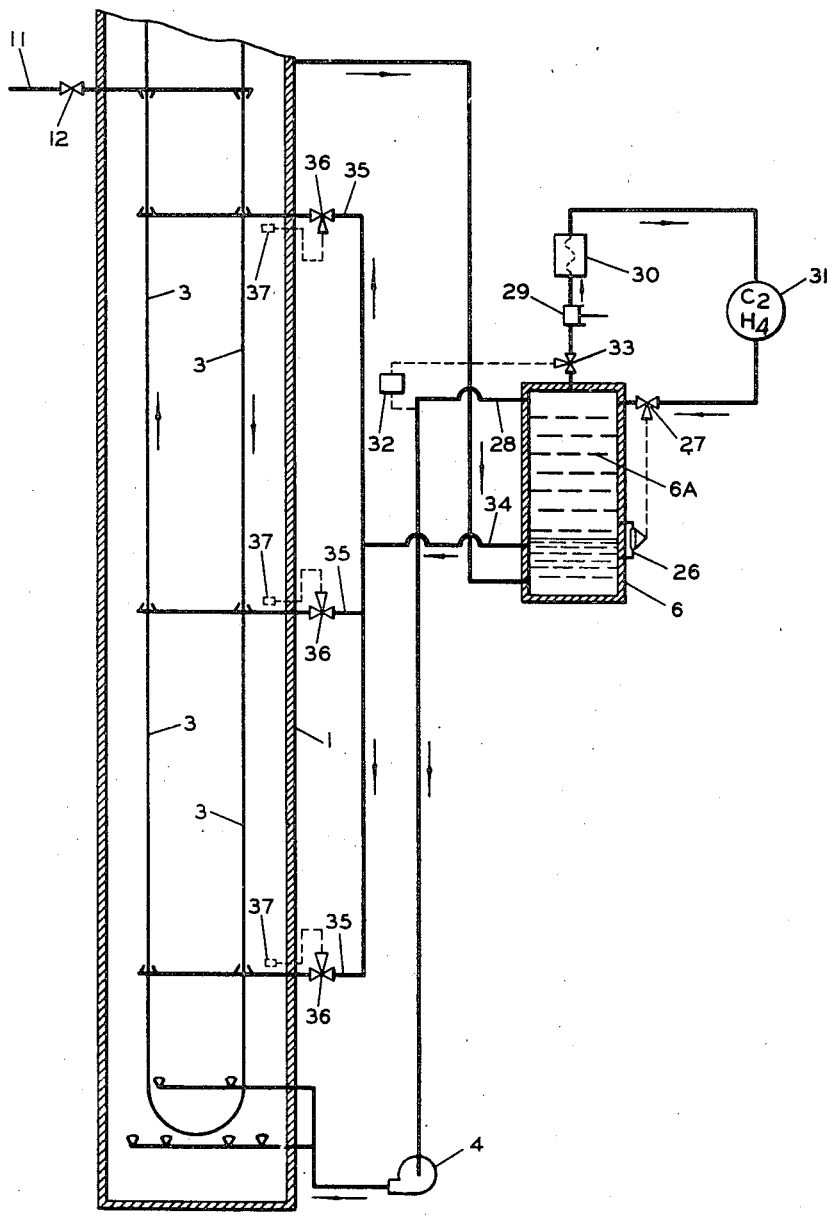

Fig. 6 portrays equipment for practicing another modification of my invention.

In accordance with my invention unsaturated organic material is polymerized to solid form in a continuous manner by continuously feeding a flexible relatively flat supporting belt, which may be made of any suitable material which does not constitute a contamination of the plastic being made, for example a web previously formed of the material being produced, into a closed polymerization vessel, continuously applying in any suitable manner liquid containing the polymerizable unsaturated organic material to the belt at a point within the vessel, preferably substantially immediately upon its entry in the vessel, subjecting the liquid so applied to the belt to conditions effecting polymerization of the organic material to solid form before the belt leaves the vessel, continuously passing a current of innocuous gas along the liquid-coated surface of the belt, and continuously withdrawing the belt with the resulting solid polymer adhering thereto from the vessel at a rate substantially equal to that at which the belt is fed into the vessel.

I prefer to employ a vertical polymerization vessel the height of which is great relative to the width thereof, and to feed the belt through the top of the vessel, bending the belt when it approaches the bottom of the vessel and thereby causing it to move vertically upwardly, and to withdraw the belt vertically outwardly through the top of the vessel. When using such a vessel I prefer to apply the liquid containing the polymerizable material to the belt at a point adjacent the top of the vessel and to cause the liquid so applied to flow downwardly on the surface of the belt into a thin film in which it can be more readily polymerized. The liquid may be applied to one or both sides of the belt just after it has entered the vessel and may be applied to one or both sides of the belt at a point shortly before it leaves the vessel. In a preferred form of the invention, I apply liquid to both sides of both the downwardly and the upwardly moving portions of the belt.

When employing a vertical polymerization vessel in the manner just described, I prefer to pass a current of innocuous gas upwardly along the liquid-coated surface or surfaces of the belt. This innocuous gas may perform a plurality of functions. A very important function of the gas is to remove the heat of polymerization substantially immediately upon its generation. In a preferred form of the invention the current of innocuous gas is passed upwardly at a velocity such that the gas causes the liquid to flow slowly downwardly, even though it be of negligible viscosity, and spread out into a film of substantially uniform thickness on the surface of the belt.

I prefer to have the belt move at a slow rate relative to the velocity of the gaseous current. For example, the belt may travel at a rate of say one foot per minute and the upwardly moving gas may have a velocity, for example ranging from 75 to several hundred feet per minute, whereby the difference in absolute velocity of the two portions of the belt by reason of the fact that one portion of the belt is moving downwardly while the other portion of the belt is moving upwardly, becomes insignificant relative to the velocity of the gaseous current. The gaseous current flows upwardly at such a velocity and in such a manner as to resist the downward flow of the liquid on the belt. If desired, suitable vertical baffles parallel to the belt may be provided so as to accentuate this action of the gaseous current upon the liquid applied to the belt by narrowing the width of the space through which the gaseous current must pass.

The gaseous stream is maintained at a temperature suitable for the reaction in question. For example when butyl rubber is being made, a reaction temperature in the neighborhood of —100° C. may be maintained. It is preferred that the gas be substantially at the desired reaction temperature. Preferably such a large volume of gas is circulated that in removing the heat of polymerization, its temperature is not raised more than a few degrees before attaining the top of the polymerization vessel and withdrawal therefrom to suitable cooling means.

If desired, a suitable catalyst may be added to the liquid applied to the belt or to the gas phase being circulated within the polymerizing vessel or to both of them. In a preferred embodiment of my invention as applied to the manufacture of butyl rubber, a gaseous catalyst, namely boron fluoride, is included in the gas circulated in the vessel for temperature control and for control of liquid on the belt.

By reason of the contact of the liquid film on the belt with the gas phase moving at high velocity, fresh liquid surface is continuously exposed to the gas so that polymerization takes place rapidly and under excellent control. Where the catalyst is gaseous and is included in the gaseous phase, intimate contact between the catalyst and the fresh surface of liquid is constantly maintained. As polymer is formed, it clings to the surface of the belt, increasing its thickness and fresh liquid added flows over the polymer formed so that the layer of formed product constantly grows in thickness on the sides of the slowly moving web. As an example, the polymerizing chamber may be 30 feet high, and downward and upward through it moves continuously a belt, initially for example $\frac{1}{16}$ inch thick and 3 feet wide and finally, by deposition of product, 1 inch thick and 3 feet wide.

When making butyl rubber in accordance with my invention, I prefer that the gas being circulated be comprised largely or consist essentially of ethylene, with or without an added gaseous catalyst, preferably boron fluoride.

When the sheet of product leaves the polymerizer it may be treated in any suitable manner for neutralization of any residual catalyst therein. The polymer may be scraped from the belt in any suitable manner, or in the preferred case where the belt is composed of the polymerization product, the entire belt may be ground or cut up into suitable lengths, for compounding.

The belt may be of any suitable flexible material which does not contaminate the product such as steel or other metal, plastic such as "Saran" (polyvinylidene chloride), rubber or the like. The product formed on the belt may be stripped therefrom outside of the process, the same belt thereupon being continually re-used. The belt may also be made of the polymer produced in the process which, by a minimum of compounding was made into a thin sheet of sufficient tensile strength and which may be left in the attached polymer for further and final processing with it. It is preferably not made of cotton or similar material, whose fibers would contaminate the product, but it may be made of a proper size of "Nylon" sheet or fiber from which the coating may be stripped.

In a preferred embodiment of my invention, the belt is made of any suitable elastic or stretchable material and suitable means is provided for intermittently throughout the polymerization stretching the belt and then allowing it to contract. In this way linear orientation of the polymer molecules during their formation is effected. This is very advantageous. The alternate stretching and contraction of the belt may be carried out at any suitable frequency, ranging from several times per minute to several hundred times per minute, depending upon the wishes of the operator. Generally, for practical reasons, it is preferred to effect this stretching and contraction of the belt in a direction parallel to that in which the belt is moving. However, within the broad purview of this aspect of my invention, the belt may be stretched and allowed to contract in any direction, for example, transversely of the direction of advance within the polymerization vessel.

The liquid containing the polymerizable organic material may be applied to the belt in any manner, for example, by spraying, jetting, etc. Any suitable means such as nozzles, jet, cone sprays or the like may be employed. Usually I prefer to apply the liquid in such manner that substantially the entire amount of liquid fed into the polymerizing vessel is applied to and retained on the belt instead of having some liquid projected onto the walls and other portions of the polymerizing vessel. The provision of suitable means for accomplishing this result will be well within the skill of the art.

Generally the polymerization vessel is operated at a pressure ranging from just above atmospheric to moderately elevated superatmospheric pressure. Ordinarily the pressure will range from 10 to 75 pounds per square inch gage. I do not desire, however, to preclude the use of pressure higher than 75 pounds. In order to prevent loss of gas from the polymerizing vessel operated under these conditions, suitable provision must be made for effecting the feeding of the belt into the vessel and the withdrawal of the polymer-coated belt from the vessel without substantial leakage of gas from the vessel at the points of inlet and exit of the belt. One such means is shown in the drawings and will be described more fully hereinafter.

In the preferred form of my invention in which butyl rubber is made continuously in a vertical polymerization vessel such as is illustrated in the drawings, ethylene is employed as the gas for removing the heat of polymerization from the surface of the belt and for causing the liquid to flow into a film of substantially uniform thickness on the surfaces of the belt. Preferably the ethylene gas is at a temperature of not over 5° C. above its dew point under the pressure prevailing in the polymerizer. Generally it is preferred that the ethylene be substantially at its dew point when introduced. The dew point of the ethylene will be determined by the pressure in the polymerizing vessel. At atmospheric pressure, the boiling point of ethylene is −104° C., and as the pressure is increased the boiling point of course rises. As the ethylene passes upwardly over the surface of the belt, it removes the heat of polymerization as sensible heat. The ethylene gas is withdrawn from the top of the vessel at a rate such as to hold the pressure in the vessel constant at the desired figure. I prefer to subject the withdrawn gas to intimate countercurrent contact with boiling liquid ethylene at a pressure substantially equal to that prevailing in the polymerizing vessel. The resulting ethylene gas is at substantially the dew point of ethylene and is injected into the bottom of the polymerizing vessel. Any suitable means such as a fan or blower may be employed to effect the introduction of the gas into the polymerizer and the desired high velocity travel of the gas through the polymerizer. I prefer to remove a portion of the ethylene gas phase from the top of the contacting zone, compress and cool to liquefy same and inject the resulting liquid condensate into the top of the countercurrent gas-liquid contacting zone at a rate such as to remove sensible heat from the contacting zone at the same rate as heat is removed from the polymerizing vessel by the ethylene gas.

In some cases liquid ethylene may be incorporated in the liquid applied to the belt in the polymerizing vessel. Vaporization of this liquid ethylene on the surface of the belt may be allowed to occur thereby additionally removing heat of polymerization and enabling even better control of the reaction on the belt.

Under some circumstances it may be desirable to apply liquid ethylene substantially at the boiling point at the pressure prevailing in the polymerizing vessel multipointwise on the coated surface of the belt. This liquid ethylene may be caused to evaporate from the surface of the belt and thereby aid in removing heat of polymerization.

Where ethylene is included in the liquid applied to the belt and is allowed to evaporate on the surface of the belt, or where liquid ethylene is applied multipointwise on the surface of the belt, it is often preferred that the gas circulated upwardly along the belt at high velocity be a non-condensible gas such as hydrogen, methane, carbon monoxide, etc. Use of such a non-condensible gas in place of ethylene may be desirable in order to accelerate vaporization of the liquid ethylene so applied to the belt. It will be obvious that liquid ethylene can vaporize into a non-condensible atmosphere much more readily than it can into an atmosphere of condensible gas such as ethylene close to its dew point.

It is preferred that the liquid composition containing the polymerizable unsaturated material which is applied to the belt, be refrigerated to cool it down to essentially the polymerization temperature. For example, in making butyl rubber at −100° C., I prefer to previously refrigerate the liquid containing isobutylene and diolefin to essentially −100° C. in order that substantially no flashing may occur when it is injected into the polymerization vessel. However, it is within the scope of my invention, where liquid ethylene is included in the butyl rubber feed, to allow no substantial flashing of liquid ethylene from the surface of the belt provided that no substantial evaporation of the polymerizable components, isobutylene and diolefin, take place.

The formulation of a suitable butyl rubber feed liquid is well within the skill of the art and need not be described in detail. Generally the feed contains a major proportion of isobutylene and a minor proportion of an aliphatic conjugated diolefin such as butadiene, isoprene, etc. Usually the proportion of diolefin ranges from 0.5 to 30 per cent by weight based on the total weight of isobutylene and diolefin. While I prefer to use a gaseous catalyst such as boron fluoride, I do not wish to preclude the use of a non-gaseous catalyst such as aluminum chloride. Such a non-gaseous catalyst may be incorporated in the liquid polymerization mixture applied to the belt and may be neutralized outside the polymerization vessel in any suitable manner.

While my invention is especially applicable to the manufacture of butyl rubber, it may be employed for conducting any other type of polymerization wherein a polymerizable unsaturated organic compound in the form of a liquid, i. e. either liquid as such or forming a liquid mixture with a suitable diluent or solvent, is converted to solid form by polymerization. Examples are polymerization of unsaturated hydrocarbons such as diolefins, olefins, styrene and other unsaturated organic compounds such as acrylic and methacrylic acids and esters, vinyl compounds, such as vinyl chloride, vinyl acetate, vinyl chloride-vinyl acetate mixtures which yield copolymers, vinylidene chloride.

Figure 1:
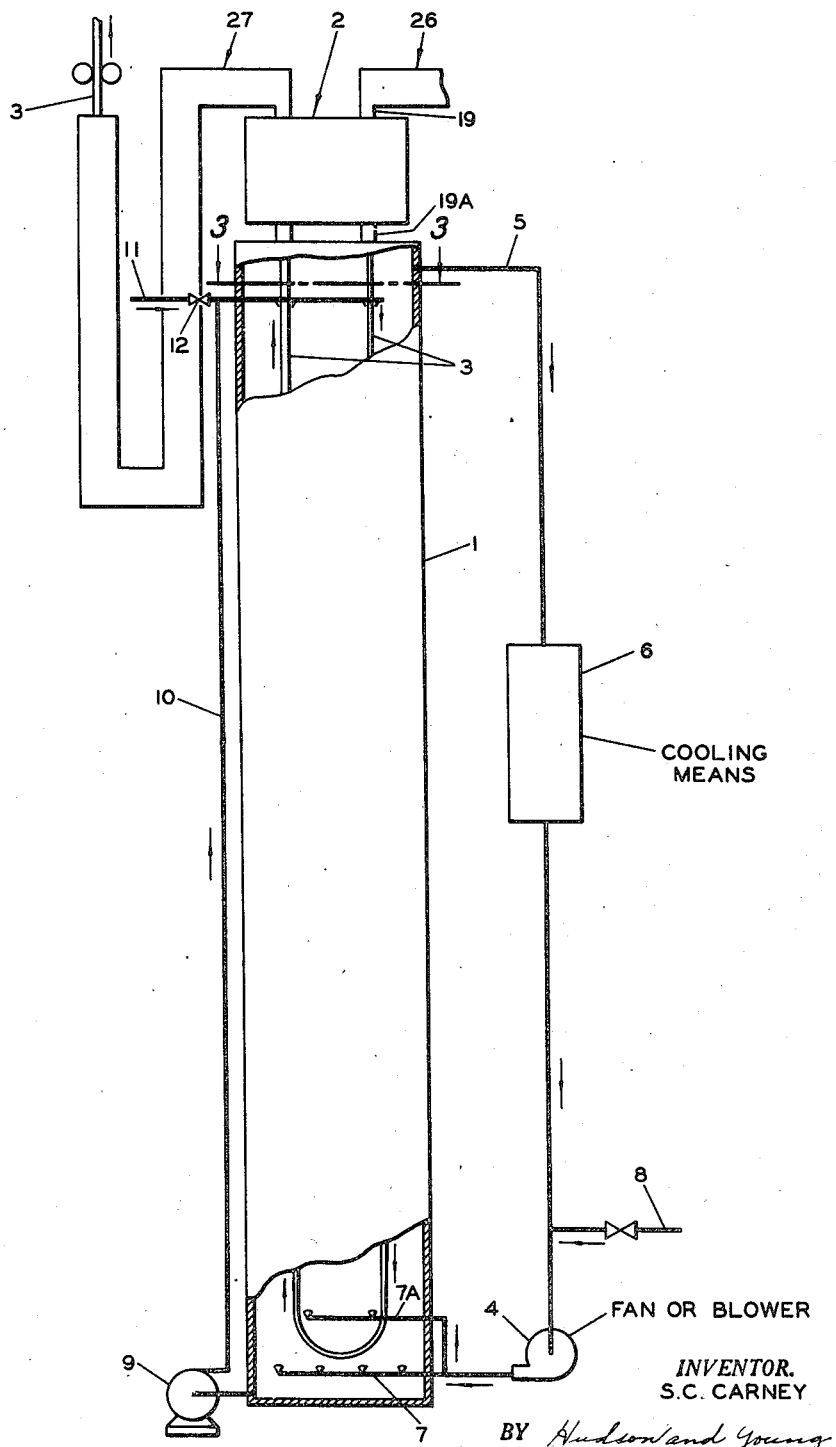
Figure 2:
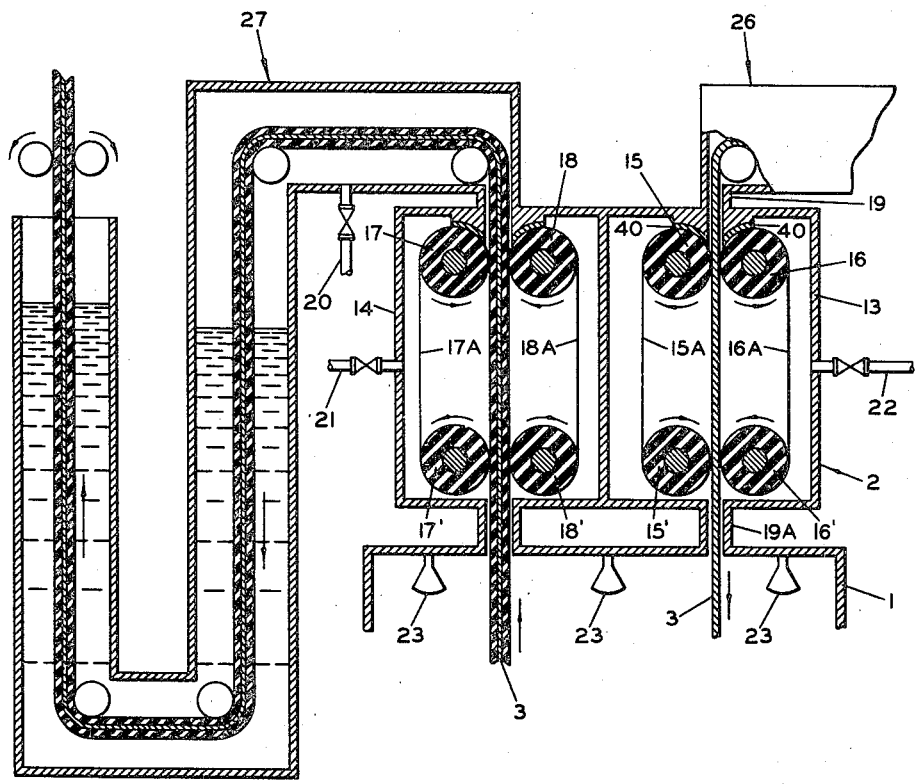
Fig. 2 is a detailed vertical sectional view of the means for sealing the inlet and exit to the polymerizing vessel so as to prevent escape of gas therefrom.
Figure 3:
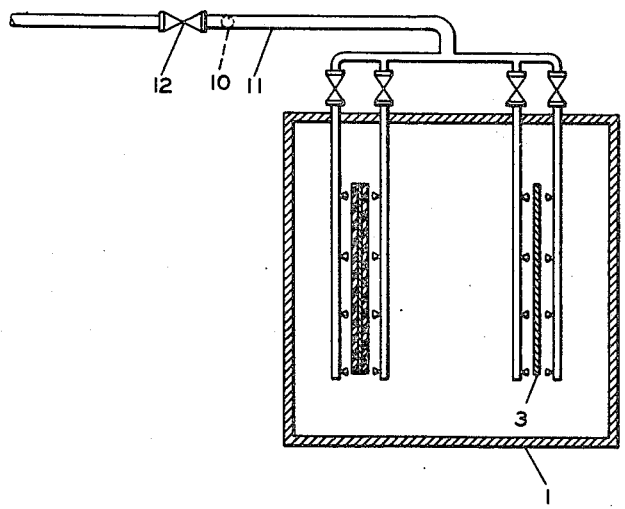
Fig. 3 is a horizontal section taken on the line 3—3 of Fig. 1 looking in the direction of the arrows.

Referring now to the drawings and first to the embodiment shown in Figs. 1 to 3, reference numeral 1 designates the polymerizing vessel which is shown in the form of a square shell capable of resisting the moderately elevated pressures used in the polymerization. It may be rectangular and of any desired depth depending on the width of the belt. It may be circular which has the advantage of increased resistance to crushing under a given pressure for a given size but has the disadvantage that baffles may be needed in order to limit the width of the gas space adjacent the sides of the belt and make the gas space on the outside of the belt of uniform cross section.

The belt 3 enters and leaves the vessel 1 through a member designated generally as 2 mounted on the top of the polymerization vessel 1. A fan or blower 4 moves gas from the top of the shell 1 through line 5 by way of cooler 6 and discharges gas into the base of the shell 1 through lines 7 and 7A which are provided with jets for jetting the gas upwardly. A suitable gaseous catalyst, such as boron fluoride, and/or make-up gas may be introduced to the gas stream by line 8. Pump 9 may be provided for pumping to the top of the shell 1 through line 10 any liquid collecting in the base of shell 1. Through line 11 and the associated lines entering shell 1, liquid to be polymerized is introduced at one or more points into the shell 1 and is distributed uniformly across the width of belt 3. As shown, the liquid may be introduced to any of the sides of the belt 3.

As will be seen from Fig. 2, the belt 3 is fed into vessel 1 from a liquid seal designated generally as 26 which is identical with the liquid seal 27 shown in detail at the left. The belt is fed in through gas lock 13 and leaves through gas lock 14. Locks 13 and 14 are so constructed that no or only very little leakage of gas outwardly can occur. The incoming belt is fed by the two endless belts 15A and 16A encircling rollers 15 and 15′ and 16 and 16′. Belts 15A and 16A are preferably made of stainless steel. These rollers are shown as being deformable with the usual rigid core or axle. Line 22 supplies gas under pressure, which pressure may be intermediate between that in the vessel 1 and that prevailing in the adjacent portion of liquid seal 26. The gas supplied by line 22 may be any suitable gas, for example, it may be any inert inexpensive gas. As is shown, the seal between gas lock 13 and liquid seal 26 may be accentuated by the use of gaskets 40 which may touch the steel feed bands 15A and 16A. The seal may be further insured by the use of suitable lubricants. Close clearances are provided between the belt 3 and the throat 19 entering the gas lock 13 and the throat 19A entering the shell 1. Thus if any slight leakage does occur, it takes place from the shell 1 into the gas lock 13. Similar provision is made for sealing the belt 3 as it leaves the vessel. Rollers 17 and 17' and 18 and 18' are provided with stainless steel bands 17A and 18A, respectively, and feed the belt 3 with the polymer layers thereupon outwardly without injury to the polymer. A gas may be supplied at an intermediate pressure via line 21.

Suitable lubricants, such as for example stearic acid, may be used wherever desirable to aid in the maintenance of a gas-tight seal.

Sealing units 26 and 27 are in the form of U-shaped members in which there is provided a suitable heavy liquid such as mercury, which serves to prevent any escape of gas to the outside atmosphere. The pressure differential between the two sides of the U will ordinarily be very small so that it is easily sealed by the means shown. If desired, an inert gas at a pressure intermediate between that supplied to gas lock 14 and atmospheric pressure may be supplied to the inward side of the U members 26 and 27 as shown, for example, by pipe 20.

If desired, sources of actinic light bearing reference numeral 23 may be provided at any suitable points in the polymerizing vessel 1 for the purpose of accelerating the polymerization.

Figure 4:
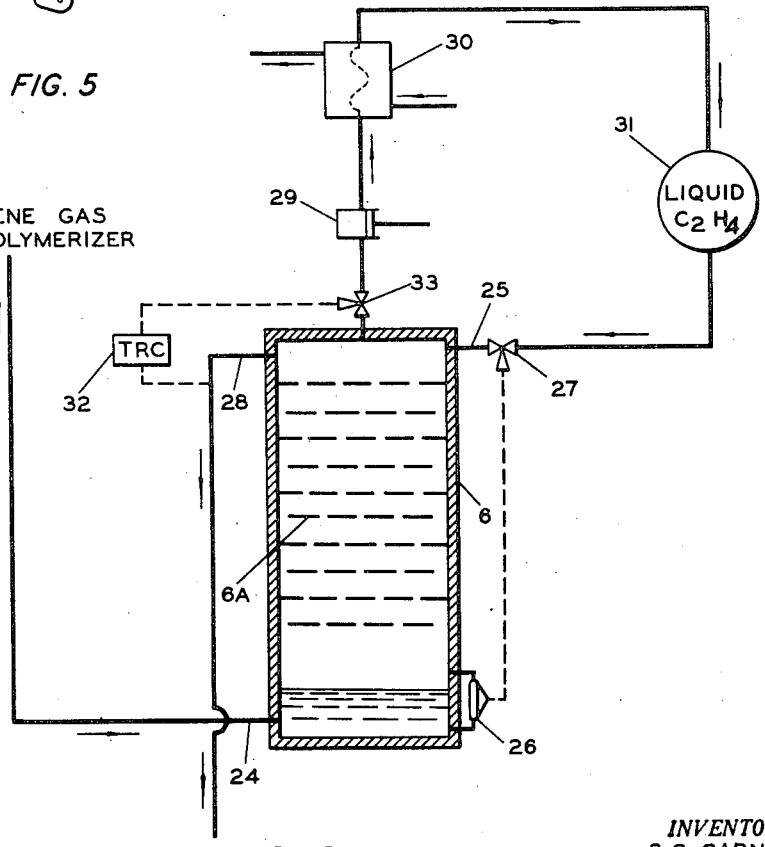
Fig. 4 is a diagrammatic representation of a preferred arrangement of equipment for removing the sensible heat liberated by the polymerization, from the ethylene gas circulated in the polymerizing vessel.

Cooler 6 may take any suitable form, however, I often prefer to emply a countercurrent gas-liquid scrubber 6 such as is shown in Fig. 4 wherein the ethylene gas coming from the polymerizer 1 is contacted intimately and countercurrently with boiling liquid ethylene at substantially the pressure prevailing in the polymerizer 1. Unit 6 may be any suitable tower provided with the usual contacting means 6A such as bubble trays. The gas is fed in via line 24 and contacts liquid ethylene fed in by line 25. A liquid level controller 26 is provided, controlling pressure reduction or expansion valve 27, through which liquid ethylene is injected, in such manner as to prevent the liquid level in unit 6 from rising above a certain point in unit 6. The resulting ethylene gas may be withdrawn from the gas phase in the top of unit 6 via line 28.

In order to remove the heat imparted to the boiling ethylene in unit 6, a suitable proportion thereof is passed from the gas space to compressor 29 where it is compressed to a suitable pressure. It is then passed into cooler 30 where it is contacted with any suitable cooling medium such as, for example, liquid propane. The resulting liquid ethylene may be stored in surge tank 31 whence it is injected as needed into unit 6 through valve 27.

In order to maintain the temperature of the ethylene returned to the polymerizer 1 via line 28 at a suitable low level near the dew point, a temperature recorder-controller 32 of conventional design controlling valve 33 leading to compressor 29 is provided. If the temperature of the ethylene gas returning to the polymerizer 1 rises above a certain predetermined figure, controller 32 operates to open valve 33 thereby effecting removal of more heat from unit 6 by the refrigerating system shown.

Figure 5:
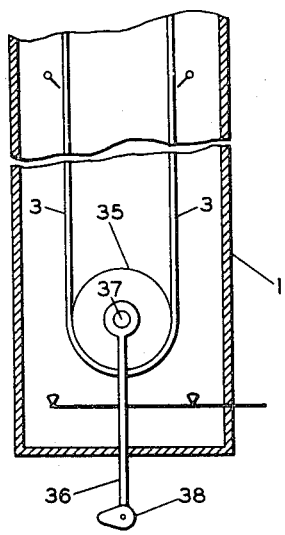
Fig. 5 is a vertical sectional view of a modified polymerizing vessel for carrying out a modification of my invention.

In Fig. 5 a roller 35 of substantial diameter and weight is located in the lower loop of belt 3 which is elastic. Rods 36 surrounding the ends of the shaft 37 of roller 35 extend downwardly through the shell of the polymerizing vessel 1. Rotating cams 38 intermittently lift and drop roller 35, thereby causing the belt 3 to elongate and contract as the polymer molecules are being formed thereon, whereby orientation of the molecules is obtained. While in this figure liquid is shown as being applied to only the outside of belt 3, it may be applied to both the outside and the inside thereof.

Instead of the means shown in Fig. 5 for orienting the polymer molecules as they are being formed, any other suitable means may be employed. For example, vibrating means of known type such as electromagnetic vibrators may be used to effect the cyclic elongation and contraction of the elastic belt 3.

In Fig. 6 means is shown for applying liquid ethylene at a plurality of points on the surface of belt 3 whereby evaporation thereof additionally aids in removal of the heat of polymerization. In this modification, the liquid level controller 26 is located somewhat further above the bottom of vessel 6 and liquid ethylene at the boiling point is withdrawn via line 34 and injected multipointwise onto the belt 3 in vessel 1 by means of lines 35. Valves 36, actuated by temperature responsive bulbs 37 within the polymerizer are provided for insuring that the amount of ethylene injected at each point is such as to give the desired temperature within the polymerizing zone.

The functions of the current of gas in the polymerizer 1 are:

(1) By its upward velocity, which may be controlled by the operator, for example by regulating the speed of blower 4 or in any other suitable manner, to make the liquid feed applied to the belt 3 flow downwardly at the desired slow rate, even though the liquid be of low viscosity;

(2) To agitate the liquid at the gas-liquid interface so as to expose a constantly changed surface at said interface;

(3) To maintain constant temperature by removal of heat;

(4) To serve as diluent for gas phase catalyst, some of the more active of which, for example boron fluoride, must be used in extreme dilution, and thereby to enable the attainment of better control than is possible when the catalyst is in liquid phase;

(5) To serve as a transparent medium through which actinic light may readily be transmitted if desired;

(6) To act as a gas phase in equilibrium with the liquid being processed, whereby change in composition of the liquid mixture by evaporation is prevented or is subjected to precise control; in this way volatile liquids may be polymerized under their own pressure;

(7) To permit the very rapid removal of heat from polymerizations which must be carried out at extremely low temperatures as typified by butyl rubber manufacture;

(8) To permit reactions which produce viscous and sticky reaction mixtures as intermediate products, without contact of the product when it is in viscous and sticky phase with the walls of the reaction vessel or with any other solid medium.

From the foregoing description many advantages of my invention will be immediately apparent to those skilled in the art. The principal advantage is that the polymerization takes place with improved control and continuously. Another advantage is that the heat of reaction is immediately removed from the point at which it is liberated. Another advantage is that the polymerization is carried out in a simple and economical manner. Another advantage is that the equipment required is comparatively simple and adapted to long life with a minimum of shutdown and repair. As has been pointed out in detail above, the process is especially advantageous when it is employed for the manufacture of butyl rubber. The manufacture of butyl rubber in the past has been exceedingly difficult to control satisfactorily, and in many cases the reaction became uncontrollable with the result that it was necessary to remove the product from the reaction vessel by methods similar to those used in the mining industry. With my invention the possibility of such an occurrence is completely obviated in a simple and economical manner. Many other advantages will be recognized by those skilled in the art.

I claim:

1. The method of continuously polymerizing unsaturated organic material to a solid form which comprises continuously feeding a flexible relatively flat supporting belt vertically downwardly into a closed vertical polymerization vessel, bending said belt in the lower portion of said vessel and thereby causing it to move vertically upwardly, continuously flowing liquid containing polymerizable unsaturated organic material onto both sides of said belt immediately after it enters said polymerization vessel and at a point near the top of said vessel and causing said liquid to flow downwardly on the surface of said belt, subjecting said liquid on said belt to conditions effecting polymerization of said organic material to solid form before said belt is withdrawn from said vessel, passing a current of cooler innocuous gas upwardly along the liquid-coated surface of said belt at a velocity such that said gas impedes the downward flow of said liquid to an extent such that it flows slowly downwardly and causes said liquid to spread out into a film of substantially uniform thickness on the surface of said belt and in such manner that said gas simultaneously removes the heat of polymerization substantially immediately upon its generation, continuously withdrawing said belt with the resulting layer of solid polymer adhering thereto vertically outwardly from said vessel at a rate substantially equal to that at which said belt is fed into said vessel and effecting said feeding of said belt into said vessel and said withdrawal of said belt from said vessel without substantial loss of gas from said vessel.

2. The method of continuously polymerizing unsaturated organic material to solid form which comprises continuously feeding an elastic relatively flat supporting belt into a closed polymerization vessel, continuously applying liquid containing polymerizable unsaturated organic material to said belt at a point within said vessel, subjecting the liquid applied to said belt to conditions effecting polymerization of said organic material to solid form before said belt is withdrawn from said vessel, continuously introducing into said vessel a current of cooler innocuous gas continuously passing said current of gas along the liquid-coated surface of said belt, continuously withdrawing said current of gas from said vessel, continuously withdrawing said belt with the resulting solid polymer thereon from said vessel at a rate substantially equal to that at which said belt is fed into said vessel, and intermittently throughout said polymerization stretching said belt and then allowing same to contract and thereby effecting linear orientation of the polymer molecules during their formation.

3. The method of continuously making butyl rubber which comprises continuously feeding an elastic relatively flat supporting belt into a closed polymerization vessel, continuously applying a relatively thin film of liquid containing isobutylene and a minor proportion of an aliphatic conjugated diolefin to said belt at a point within said vessel, subjecting the liquid applied to said belt to conditions effecting polymerization of said isobutylene and diolefin to solid form before said belt is withdrawn from said vessel, continuously introducing into said vessel a current of cooler innocuous gas, continuously passing said current of gas along the liquid-coated surface of said belt and thereby removing the heat liberated by polymerization substantially immediately upon its generation, continuously withdrawing said current of gas from said vessel, continuously withdrawing said belt with the resulting solid polymer thereon from said vessel at a rate substantially equal to that at which said belt is fed into said vessel, effecting said feeding of said belt into said vessel and said withdrawal of said belt from said vessel without substantial loss of gas from said vessel, and intermittently throughout said polymerization stretching said belt and then allowing same to contract and thereby effecting linear orientation of the polymer molecules during their formation.

4. The method of continuously making butyl rubber which comprises continuously feeding a flexible relatively flat supporting belt vertically downwardly into a closed vertical polymerization vessel, bending said belt in the lower portion of said vessel and thereby causing said belt to move vertically upwardly, continuously applying liquid containing isobutylene and a minor portion of an aliphatic conjugated diolefin to both sides of said belt at a point near the top of said vessel and causing said liquid to flow downwardly on the surface of said belt, subjecting the liquid applied to said belt to the action of a catalyst and conditions effecting polymerization of said isobutylene and said diolefin to solid form before said belt is withdrawn from said vessel, continuously introducing cooler ethylene gas at a temperature not over 5° C. above the dew point thereof under the pressure prevailing into the bottom portion of said vessel and continuously passing same upwardly therein along the liquid-coated surface of said belt at a velocity such that said gas impedes the downward flow of said liquid to an extent such that it flows slowly downwardly and causes said liquid to spread out into a film of substantially uniform thickness on the surface of said belt and simultaneously removes the heat of polymerization substantially as rapidly as it is generated, applying liquid ethylene to the coated surfaces of said belt at least one point below the point of polymerization charge stock addition at the boiling temperature of ethylene within said vessel, thereby additionally to remove heat of polymerization, continuously withdrawing gas from the upper portion of said vessel at a rate such as to maintain the pressure therein substantially constant, continuously withdrawing said belt with the resulting layer of solid polymer adhering thereto vertically outwardly from the top of said vessel, and effecting said feeding of said belt into said vessel and said withdrawal of said belt from said vessel without substantial loss of gas from said vessel.

5. The method of continuously making butyl rubber which comprises continuously feeding a flexible relatively flat supporting belt vertically downwardly into a closed vertical polymerization vessel, bending said belt in the lower portion of said vessel and thereby causing said belt to move vertically upwardly, continuously applying liquid containing isobutylene and a minor proportion of an aliphatic conjugated diolefin to said belt at a point near the top of said vessel and causing said liquid to flow downwardly on the surface of said belt, subjecting the liquid applied to said belt to the action of a catalyst and conditions effecting polymerization of said isobutylene and said diolefin to solid form before said belt is withdrawn from said vessel, continuously introducing ethylene gas at a temperature not over 5° C. above the dew point thereof under the pressure prevailing into the bottom portion of said vessel and continuously passing same upwardly therein along the liquid-coated surface of said belt at a velocity such that said gas impedes the downward flow of said liquid to an extent such that it flows slowly downwardly and causes said liquid to spread out into a film of substantially uniform thickness on the surface of said belt and simultaneously removes the heat of polymerization substantially as rapidly as it is generated, continuously withdrawing resulting warmed ethylene gas from the upper portion of said vessel at a rate such as to maintain the pressure therein substantially constant, subjecting said warm withdrawn gas to intimate contact with a mass of cooler liquid ethylene at a pressure substantially equal to that prevailing in the polymerizing vessel and passing resulting cold ethylene gas at substantially the dew point into the bottom of said vessel, continuously withdrawing said belt with the resulting layer of solid polymer adhering thereto vertically outwardly from the top of said vessel, and effecting said feeding of said belt into said vessel and said withdrawal of said belt from said vessel without substantial loss of gas from said vessel.

6. The method of continuously making butyl rubber which comprises continuously feeding a flexible relatively flat supporting belt vertically downwardly into a closed vertical polymerization vessel, bending said belt in the lower portion of said vessel and thereby causing said belt to move vertically upwardly, continuously applying liquid containing isobutylene and a minor proportion of an aliphatic conjugated diolefin to said belt at a point near the top of said vessel and causing said liquid to flow downwardly on the surface of said belt, subjecting the liquid applied to said belt to the action of a catalyst and conditions effecting polymerization of said isobutylene and said diolefin to solid form before said belt is withdrawn from said vessel, continuously introducing ethylene gas at a temperature not over 5° C. above the dew point thereof under the pressure prevailing into the bottom portion of said vessel and continuously passing same upwardly therein along the liquid-coated surface of said belt at a velocity such that said gas impedes the downward flow of said liquid to an extent such that it flows slowly downwardly and causes said liquid to spread out into a film of substantially uniform thickness on the surface of said belt and simultaneously removes the heat of polymerization substantially as rapidly as it is generated, continuously withdrawing resulting warmed ethylene gas from the upper portion of said vessel at a rate such as to maintain the pressure therein substantially constant, subjecting said warm withdrawn gas to intimate contact with a mass of cooler liquid ethylene in a contacting zone and at a pressure substantially equal to that prevailing in the polymerizing vessel and employing resulting cold ethylene gas at substantially the dew point as the ethylene gas introduced into the bottom of said vessel, withdrawing a portion of the ethylene gas phase from the top of said contacting zone, compressing and cooling to liquefy same and injecting resulting liquid condensate into the top of the contacting zone at a rate such as to remove sensible heat from the contacting zone at the same rate as heat is removed from the polymerizing vessel by said gas, continuously withdrawing said belt with the resulting layer of solid polymer adhering thereto vertically outwardly from the top of said vessel, and effecting said feeding of said belt into said vessel and said withdrawal of said belt from said vessel without substantial loss of gas from said vessel.

7. The method of continuously making butyl rubber which comprises continuously feeding a flexible relatively flat supporting belt vertically downwardly into a closed vertical polymerization vessel, bending said belt in the lower portion of said vessel and thereby causing said belt to move vertically upwardly, continuously applying liquid containing isobutylene and a minor proportion of an aliphatic conjugated diolefin as the sole polymerizable constituents thereof and a substantial proportion of liquid ethylene as a solvent and cooling agent to said belt at a point near the top of said vessel and causing said liquid to flow downwardly on the surface of said belt, subjecting the liquid applied to said belt to the action of a catalyst and conditions effecting polymerization of said isobutylene and said diolefin to solid form before said belt is withdrawn from said vessel, continuously introducing ethylene gas at a temperature not over 5° C. above the dew point thereof under the pressure prevailing into the bottom portion of said vessel and continuously passing same upwardly therein along the liquid-coated surface of said belt at a velocity such that said gas impedes the downward flow of said liquid to an extent such that it flows slowly downwardly and spreads out into a film of substantially uniform thickness on the surface of said belt and simultaneously removes the heat of polymerization substantially as rapidly as it is generated, causing said ethylene included in said liquid to evaporate from the surface of said belt and thereby additionally remove heat of polymerization, continuously withdrawing gas from the upper portion of said vessel at a rate such as to maintain the pressure therein substantially constant, continuously withdrawing said belt with the resulting layer of solid polymer adhering thereto vertically outwardly from the top of said vessel, and effecting said feeding of said belt into said vessel and said withdrawal of said belt from said vessel without substantial loss of gas from said vessel.

8. The process of claim 5 wherein liquid ethylene attaining the lower portion of said contacting zone and substantially at the boiling point at the pressure in said vessel is applied multipointwise along the coated surface of said belt and caused to evaporate therefrom and thereby additionally remove heat of polymerization.

9. Apparatus for continuously polymerizing unsaturated organic material to solid form comprising a closed vertical elongated vessel, a flexible relatively flat belt extending through the top of said vessel downwardly to a point adjacent the bottom thereof and then being looped and extending upwardly through the top of said vessel, means for feeding said belt into said vessel, means for withdrawing said belt from said vessel at the same rate as it is fed thereinto, means for preventing loss of gas from said vessel as said belt enters and leaves said vessel, means for applying a liquid containing polymerizable unsaturated organic material to said belt within but adjacent the top of said vessel, means for introducing a gas into said vessel adjacent the bottom thereof and causing same to move upwardly at high velocity along the liquid-coated surface of said belt, means for withdrawing said gas from the top of said vessel, means for cooling said withdrawn gas, and means for reintroducing the cooled withdrawn gas into said vessel adjacent the bottom thereof.

10. Apparatus as specified in claim 9 wherein said belt is elastic and including means for intermittently stretching said belt and then allowing same to contract as said belt advances through said vessel.

11. Apparatus as in claim 9 wherein said means for applying said liquid to said belt is arranged to apply said liquid to both sides of both the downwardly and the upwardly moving portions of said belt.

12. Apparatus as in claim 9 wherein said means for cooling said withdrawn gas comprises a vertical gas-liquid contactor, means for continuously introducing said withdrawn gas into the bottom of said contactor, means for continuously introducing a boiling liquid composed of liquefied gas corresponding to said gas introduced to said vessel into the top of said contactor and causing same to move downwardly and countercurrently contact said gas with said boiling liquid and thereby cool said gas, means for withdrawing the cooled gas at the top of said contactor and returning same to the bottom of said polymerizing vessel, means for withdrawing a portion of the gas phase from the top of said contactor, means for compressing and cooling said portion and thereby liquefying same, recycling the resulting liquid to said step of introducing said liquid, means for controlling the rate of introduction of said liquid into the top of said contactor in accordance with the liquid level in the bottom of said contactor, and means responsive to the temperature of the cooled gas returned to the bottom of said polymerizing vessel for controlling the amount of said portion of said gas phase passed to said compression and cooling means.

13. Apparatus for continuously polymerizing unsaturated organic material to solid form comprising a closed vertical elongated vessel, a flexible relatively flat belt extending through the top of said vessel downwardly to a point adjacent the bottom of said vessel and then being looped and extending upwardly through the top of said vessel, closed chambers above said vessel surrounding said belt as it enters and leaves said vessel, narrow throats connecting said chambers to said vessel, through which said belt passes with close clearance, means for introducing gas to said chambers, two pairs of vertically spaced rollers in each of said chambers, smooth flexible feed bands encircling said rollers and engaging opposite sides of said belt in functional driving relationship, a U-shaped chamber connected to each of said closed chambers, liquid seal in each of said U-shaped chambers, said belt passing through said U-shaped chambers on its way to and from said closed chambers, means for driving said rollers and thereby said feed bands at the same speed so that said belt leaves said vessel at the same rate at which it enters said vessel, means for applying a liquid containing polymerizable unsaturated organic material to said belt within but adjacent the top of said vessel, means for introducing a gas into said vessel adjacent the bottom thereof and causing same to move upwardly at high velocity along the liquid-coated surface of said belt, means for withdrawing said gas from the top of said vessel, means for cooling said withdrawn gas, and means for reintroducing the cooled gas into said vessel adjacent the bottom thereof.

14. The method of continuously polymerizing unsaturated organic material to a solid form which comprises continuously feeding a flexible relatively flat supporting belt vertically downwardly into a closed vertical polymerization vessel, bending said belt in the lower portion of said vessel and thereby causing it to move vertically upwardly, continuously flowing liquid containing polymerizable unsaturated organic material onto said belt immediately after it enters said polymerization vessel and at a point near the top of said vessel and causing said liquid to flow downwardly on the surface of said belt, subjecting said liquid on said belt to conditions effecting polymerization of said organic material to solid form before said belt is withdrawn from said vessel, passing a current of cooler innocuous gas upwardly along the liquid-coated surface of said belt at a velocity such that said gas impedes the downward flow of said liquid to an extent such that it flows slowly downwardly and causes said liquid to spread out into a film of substantially uniform thickness on the surface of said belt and in such manner that said gas simultaneously removes the heat of polymerization substantially immediately upon its generation, continuously withdrawing said belt with the resulting layer of solid polymer adhering thereto vertically outwardly from said vessel at a rate substantially equal to that at which said belt is fed into said vessel and effecting said feeding of said belt into said vessel and said withdrawal of said belt from said vessel without substantial loss of gas from said vessel.

SAMUEL C. CARNEY.

REFERENCES CITED

The following references are of record in the file of this patent:

UNITED STATES PATENTS

| Number | Name | Date |
| --- | --- | --- |
| 2,011,553 | Land | Aug. 13, 1935 |
| 2,082,486 | Frenkel | June 1, 1937 |
| 2,144,548 | Safford | Jan. 17, 1939 |
| 2,311,567 | Otto et al. | Feb. 16, 1943 |
| 2,345,013 | Soday | Mar. 28, 1944 |
| 2,418,797 | Voorhees | Apr. 8, 1947 |